(12) United States Patent
Chen

(10) Patent No.: US 6,398,368 B2
(45) Date of Patent: Jun. 4, 2002

(54) LIGHT PIPE FOR A PROJECTOR SYSTEM

(75) Inventor: Jung-Yao Chen, Chia-I Hsien (TW)

(73) Assignee: Acer Communications and Multimedia Inc., Taoyuan (TW)

( * ) Notice: Subject to any disclaimer, the term of this patent is extended or adjusted under 35 U.S.C. 154(b) by 0 days.

(21) Appl. No.: 09/858,514

(22) Filed: May 17, 2001

(30) Foreign Application Priority Data

Jun. 9, 2000 (TW) .......................................... 89111241 A

(51) Int. Cl.[7] .............................................. G03B 21/28
(52) U.S. Cl. ........................ 353/98; 353/102; 385/133; 385/901
(58) Field of Search ............................ 353/98, 99, 102, 353/122; 362/32, 335, 336, 308; 385/48, 901, 133

(56) References Cited

U.S. PATENT DOCUMENTS

| | | | | |
|---|---|---|---|---|
| 3,740,112 A | * | 6/1973 | Lundgren | 385/133 |
| 4,143,966 A | | 3/1979 | Gandini | |
| 4,813,765 A | * | 3/1989 | Negishi | 385/146 |
| 5,625,738 A | | 4/1997 | Magarill | |
| 5,696,865 A | * | 12/1997 | Beeson et al. | 385/901 |
| 5,748,376 A | * | 5/1998 | Lin et al. | 359/629 |
| 5,868,481 A | * | 2/1999 | Conner et al. | 353/102 |
| 5,884,991 A | * | 3/1999 | Levis et al. | 353/122 |
| 6,139,156 A | * | 10/2000 | Okamori et al. | 353/98 |

FOREIGN PATENT DOCUMENTS

| | | |
|---|---|---|
| WO | WO 96/33435 | 10/1996 |
| WO | WO 00/26721 | 5/2000 |

OTHER PUBLICATIONS

Williamson D E/ Cone Channel Condenser Optics/Journal of the Optical Society of America/vol. 42, No. 10/Oct. 1, 1952 pp. 712–715.

Ning X et al/Dielectric Totally Internally Reflecting Concentrators/Optical Society of America, Washington, U.S./vol. 26, No. 2/Jan. 15, 1987/pp. 300–305.

* cited by examiner

*Primary Examiner*—William Dowling
(74) *Attorney, Agent, or Firm*—Winston Hsu

(57) ABSTRACT

A light pipe is designed for a projector system. The light pipe gathers the light from a light source and guides the gathered light to an image device in the projector system. The area of the exit pupil of the light pipe is smaller than the area of the entrance pupil, and the shape of the exit pupil is scaled from that of the entrance pupil. This improves the light gathering efficiency of the light pipe.

10 Claims, 6 Drawing Sheets

LIGHT PIPE FOR A PROJECTOR SYSTEM

BACKGROUND OF THE INVENTION

1. Field of the Invention

The present invention relates to a light pipe, and more particularly, to a hollow tapering light pipe.

2. Description of the Prior Art

With the progress of optics, projectors have found broad use in many applications. Generally speaking, projected light intensity is usually an important factor while designing a projector, as the projection quality improves with greater intensities of the projected light.

Please refer to FIG. 1. FIG. 1 is a schematic diagram of a prior art light pipe 10 for a projector system 12. The projector system 12 comprises a light source 14 to generate light 11 and to guide the light 11 to the light pipe 10, and an image device 16 to project the light gathered by the light pipe 10 to a screen 13 so as to form an image. The light pipe 10 is a hollow rectangular pipe set between the light source 14 and the image device 16 to gather and guide the light 11. The light pipe 10 comprises an entrance pupil 18 and an exit pupil 19. The entrance pupil 18 is used to gather the light 11 generated by the light source 14. Then the light 11 is guided to the image device 16 through the exit pupil 19.

Please refer to FIG. 2. FIG. 2 is a position distribution of the light incident upon the entrance pupil 18 in FIG. 1. The transverse axis is a distance in the plane 15 in FIG. 1 from the center of the entrance pupil 18. The longitudinal axis is the light intensity. As shown in FIG. 2, the light closer to the center of the entrance pupil 18 is stronger, and the light farther from the center of the entrance pupil 18 is weaker. In addition, the light pipe 10 does not gather all of the light 11. The light 24 closer to the center of the entrance pupil 18 enters the light pipe while the light 25 farther from the center of the entrance pupil 18 fails to be gathered by the light pipe 10.

Please refer to FIG. 3. FIG. 3 is the incident angle distribution of the light incident upon the entrance pupil 18. The transverse axis of FIG. 3 is the incident angle of the light on the plane 15, and the longitudinal axis is the light intensity. As shown in FIG. 3, the incident angle of a traditional light bulb is in the range of 18–20 degrees. Because the light pipe 10 is a rectangular pipe with homogeneous cross-sections, the angle of the light leaving of the exit pupil 19 is also in the range of 18–20 degrees. Usually, the optic device for the image device 16, such as the liquid crystal display (LCD) or the digital mirror device (DMD), has an incident angle limitation. Owing to the incident angle limitation, the angle of the light leaving the exit pupil 19 cannot be too large. Usually, light with an angle over 30 degrees cannot be modulated by the liquid crystal display.

Please refer to FIG. 4. FIG. 4 is a schematic diagram of another prior art light pipe 20 for the projector system 12 in FIG. 1. The light pipe 20, differing from the light pipe 10, has a tapered body. The exit pupil 23 of the light pipe 20 is larger than the entrance pupil 22 to reduce the incident angle of the light.

Generally speaking, the light pipes 10, 20 are designed to reduce the light 25 leaking from the light pipes 10, 20 while maintaining a small light angle. Thus, the light gathering efficiency is improved, and the light intensity is increased. However, owing to the fact that the prior art light pipes 10, 20 have the entrance pupil 18, 22 smaller than or equal to the exit pupil 19, 23, the light 25 leaking from the light pipe 10, 20 is usually quite strong without increasing the volumes of the light pipes 10, 20. Though an arc lamp with a longer arc length can be used as the light source to reduce the incident angle in FIG. 3, it also makes the position distribution of the light in FIG. 2 smoother. Then the light leaking from the light pipe 10, 20 increases, degrading the light gathering efficiency.

SUMMARY OF THE INVENTION

It is therefore an object of the present invention to provide a light pipe having an exit pupil with a shape that is scaled from the shape of the entrance pupil to increase the light gathering efficiency of the light pipe, and to improve over the disadvantages of the prior art.

The light pipe is designed for a projector system. The projector system comprises a light source to generate light and to guide the light to the light pipe, and an image device to produce an image using the light gathered by the light pipe. The light pipe is a tapered hollow tube set between the light source and the image device. The light pipe comprises an entrance pupil and an exit pupil. The entrance pupil is a square opening at one end of the light pipe. The light generated by the light source is guided to the light pipe through the entrance pupil. The exit pupil is set at another end of the light pipe, and the area of the exit pupil is smaller than the area of the entrance pupil. The light gathered by the light pipe is guided to the image device through the exit pupil. The shape of the exit pupil is scaled from the shape of the entrance pupil so as to increase the light gathering efficiency of the light pipe.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 5:
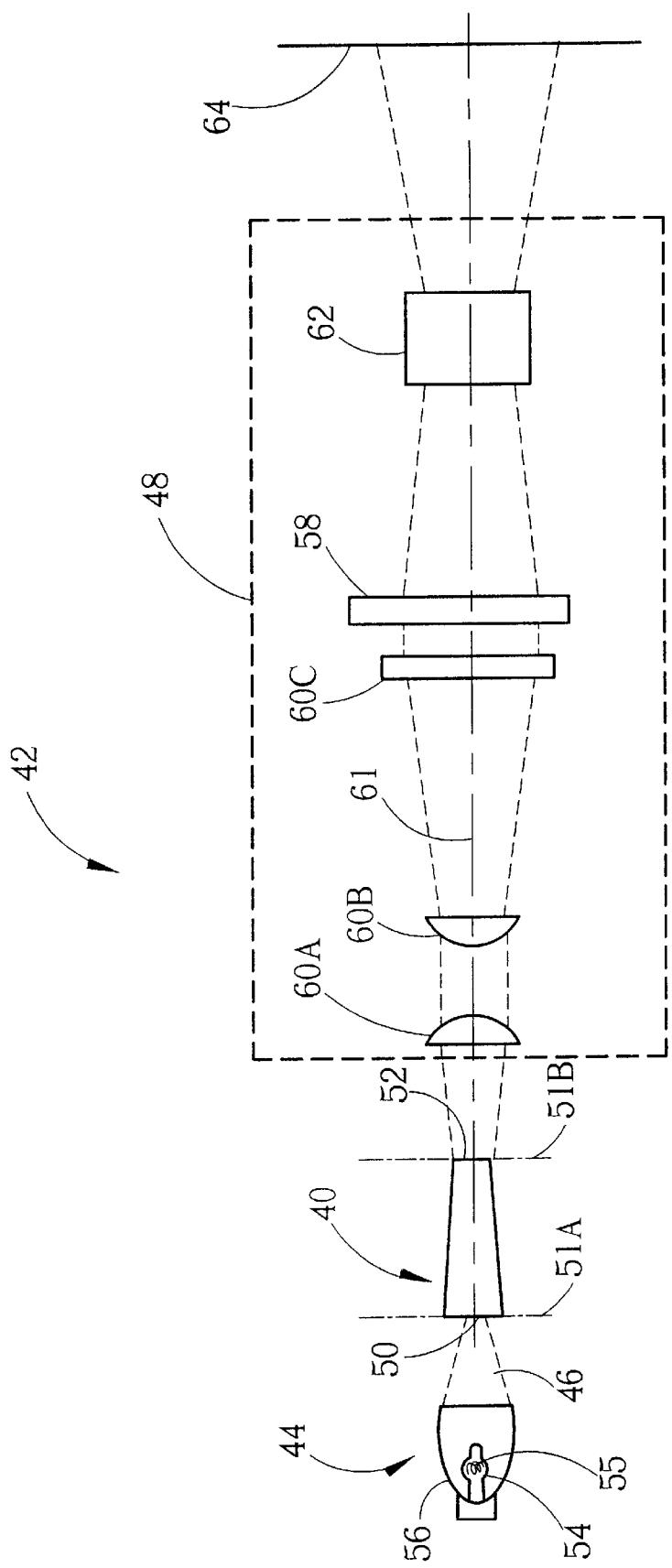
FIG. 5 is the schematic diagram of the light pipe of the present invention used in a projector system.

Please refer to FIG. 5. FIG. 5 is the schematic diagram of a light pipe 40 of the present invention used in a projector system 42. The projector system 42 comprises a light source 44 to generate light 46 and to guide the light 46 to the light pipe 40, and an image device 48 to produce an image by projecting the light 46 gathered by the light pipe 40 to a screen 64. The light pipe 40 is set between the light source 44 and the image device 48, and the projector system 42 is a projector or a liquid crystal display (LCD).

As shown in FIG. 5, the light source 44 comprises an arc lamp 54 to generate light 46, and a light collector 56, which is a lampshade in the shape of a half ellipsoid, to collect the light 46 generated by the arc lamp 54 and guide the light 46 to the light pipe 40. The arc lamp 54 is a hyper pressure mercury arc light with a long arc length 55 (Ushio, 150W, NSH150), the arc length 55 being around 1.8 mm (0.0709 inches).

The image device 48 comprises a display panel 58 set on an image path 61, a plurality of optic lenses 60A, 60B and 60C set between the light pipe 40 and the display panel 58, and a projection lens 62. The lenses 60A, 60B and 60C are used to guide the light 46 collected by the light pipe 40 to the display panel 58 to form the image. The projection lens 62 is set between the display panel 58 and the screen 64 to project the image to the screen 64.

Figure 6:
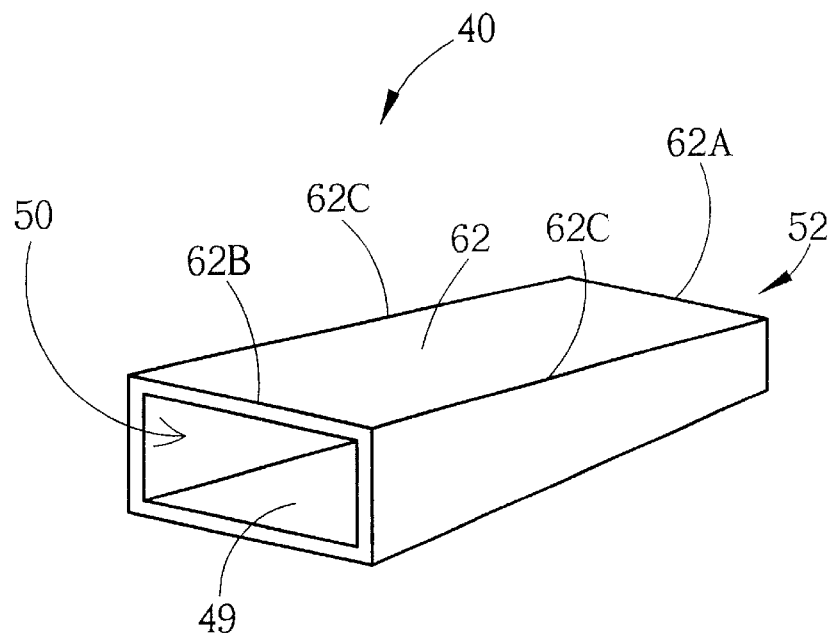
FIG. 6 is a view of the light pipe in FIG. 5.

Please refer to FIG. 6. FIG. 6 is a perspective view of the light pipe 40 in FIG. 5. The light pipe 40 is a hollow, tapering pipe constructed with four trapezoidal flat plates 62. Each of the trapezoidal flat plates 62 comprises a top end 62A, a bottom end 62B, and two sides 62C. The sides 62C of the trapezoidal flat plates 62 are joined together to from the light pipe 40. The light pipe 40 further comprises four reflector walls (mirror coatings) 49 respectively set on the inner surfaces of the four trapezoidal flat plates 62 to reflect the light 46 to the image device 48. The reflector walls 49 absorb the infrared light in the light 46 and reflect the visible portion of the light 46.

As shown in FIG. 5, the light pipe 40 comprises an entrance pupil 50 and an exit pupil 52. The entrance pupil 50 at one end of the light pipe 40 is a rectangular opening formed by the four bottom ends 62B of the four trapezoidal flat plates 62. The exit pupil 52 at another end of the light pipe 40 is a rectangular opening formed by the four top ends 62A of the four trapezoidal flat plates 62. The light 46 generated by the light source 44 is guided to the light pipe 40 through the entrance pupil 50, and the light 46 gathered by the light pipe 40 is guided to the image device 48 through the exit pupil 52. The area of the exit pupil 52 of the light pipe 40 is smaller than the area of the entrance pupil 50, and the opening shape of the exit pupil 52 is scaled from the opening shape of the entrance pupil 50. The ratio of the size of the entrance pupil 50 to the size of the exit pupil 52 is defined as the opening ratio P. In the preferred embodiment, the length of the light pipe 40 is 25 mm (0.98425 inch), the ratio of length to width for both the entrance pupil 50 and the exit pupil 52 is 4/3 or 16/9, and the opening ratio P of the light pipe 40 is about 1.25 to 1.35.

Figure 2:
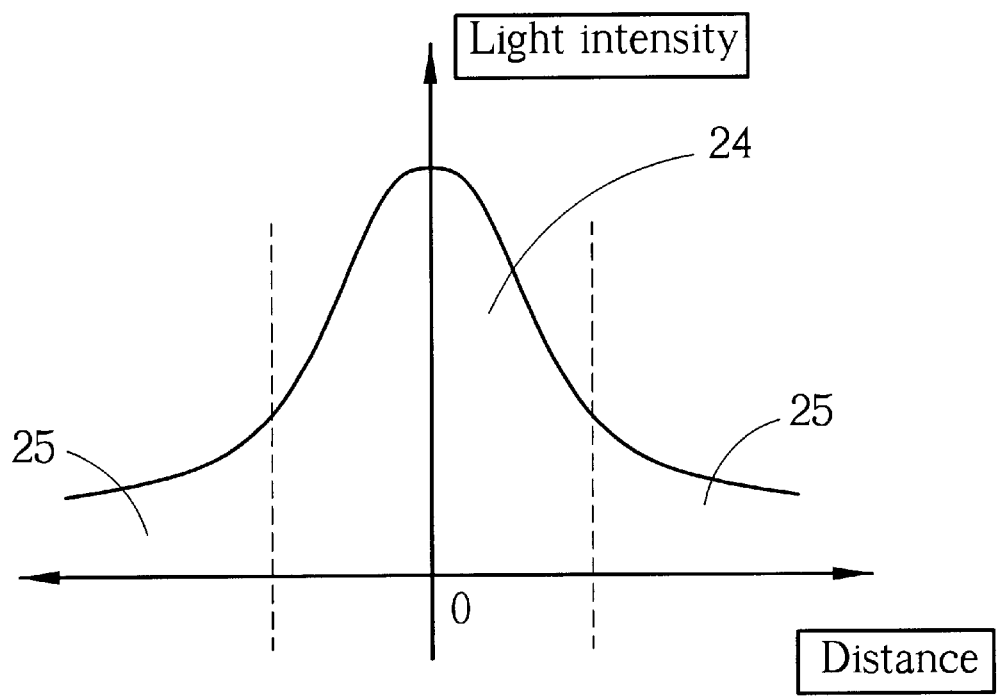
FIG. 2 is the position distribution of the light incident upon the entrance pupil in FIG. 1.
Figure 7:
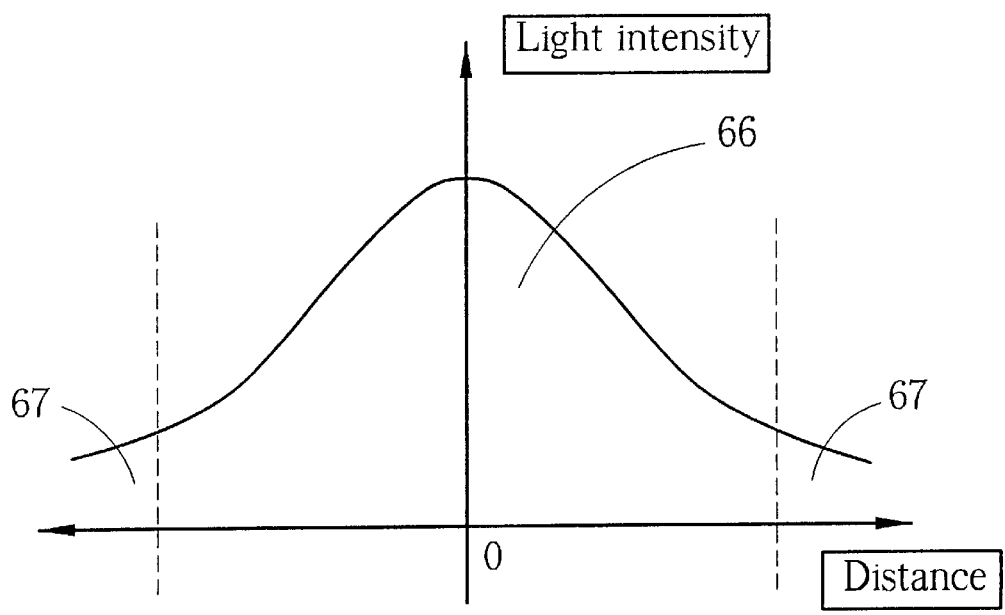
FIG. 7 is the position distribution of the light incident upon the entrance pupil in FIG. 5.

Please refer to FIG. 7. FIG. 7 is the position distribution of the light incident upon the entrance pupil 50 in FIG. 5. As in FIG. 2, FIG. 7 is plotted with the transverse axis being a distance on a plane 51A from the center of the entrance pupil 50, and the longitudinal axis being the light intensity. As shown in FIG. 7, the light pipe 40 of the present invention gathers more light 66 and leaks less light 67 in spite of the smoother light position distribution of the arc lamp 54 in comparison with FIG. 2. Because the entrance pupil 50 of the light pipe 40 of the present invention is larger than the exit pupil 52, and the shape of the entrance pupil 52 is scaled from that of the exit pupil 50, the light gathering efficiency of the present invention is increased.

Figure 3:
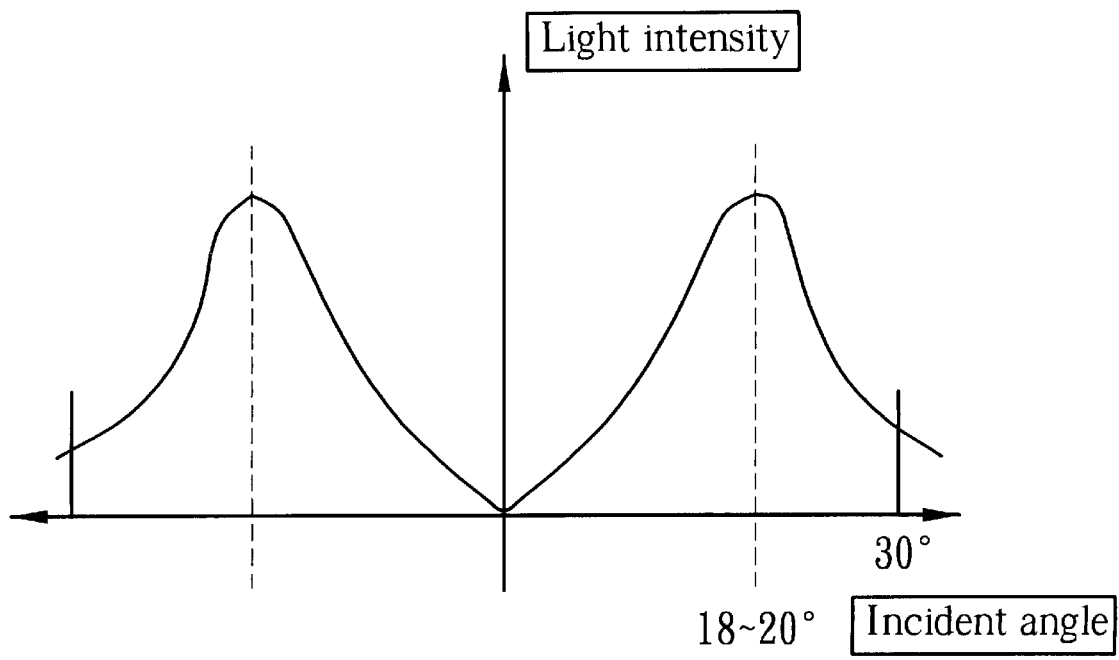
FIG. 3 is the incident angle distribution of the light incident upon the entrance pupil in FIG. 1.
Figure 4:
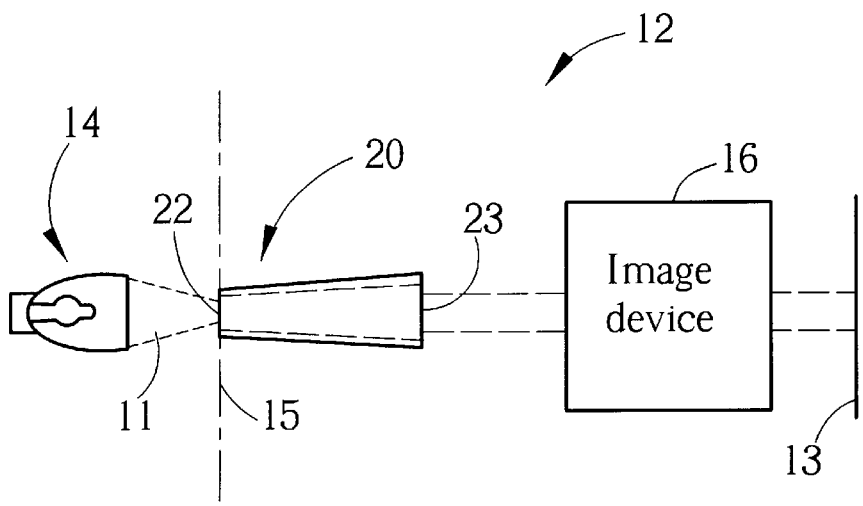
FIG. 4 is the schematic diagram of another prior art light pipe used in the projector system in FIG. 1.
Figure 8:
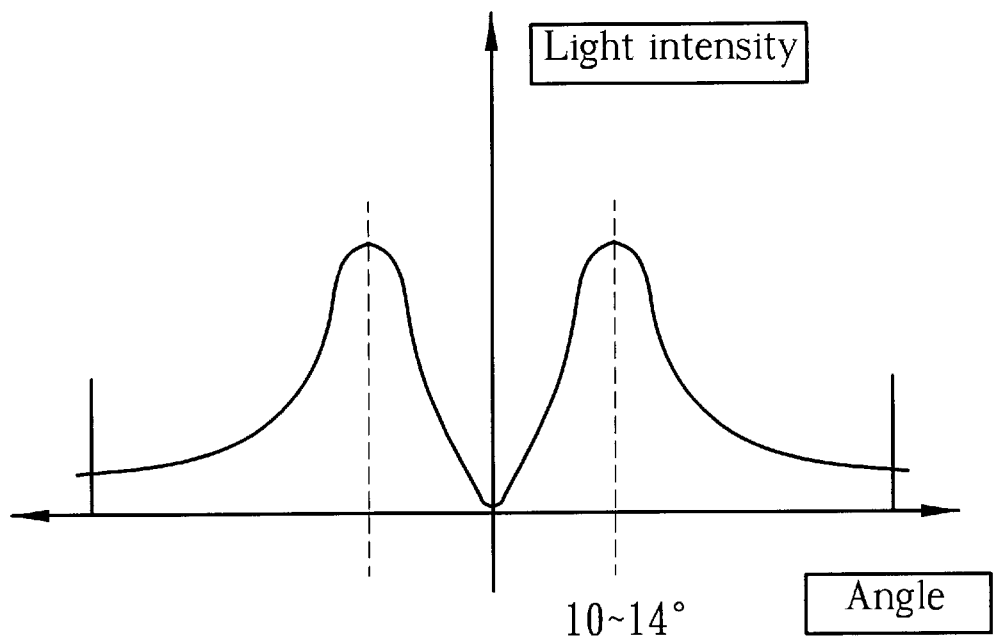
FIG. 8 is the incident angle distribution of the light incident upon the entrance pupil in FIG. 5.

Please refer to FIG. 8. FIG. 8 is an incident angle distribution of the light incident upon the entrance pupil 50 in FIG. 5. As in FIG. 3, FIG. 8 is plotted with the transverse axis being the incident angle of light on the plane 51A, and the longitudinal axis being the light intensity. As shown in FIG. 8, the incident angle of the light concentrates in the 10–14 degree range because the hyper pressure mercury light with a long arc length (Ushio, 150W, NSH150) is used in the preferred embodiment.

Figure 9:
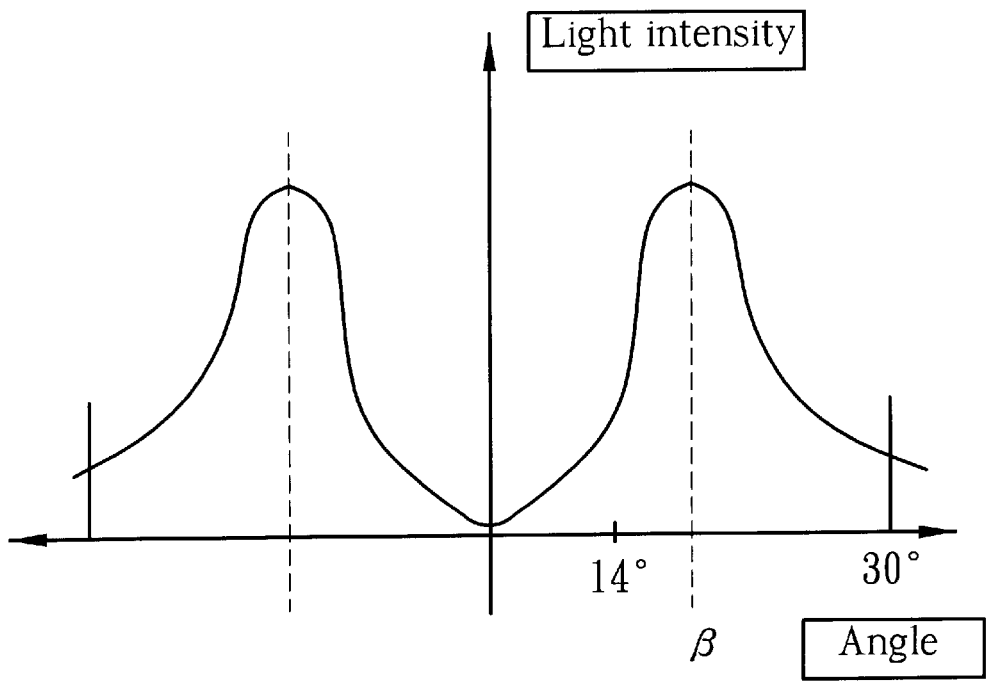
FIG. 9 is the angle distribution of the light leaving the light pipe in FIG. 5.

Please refer to FIG. 9. FIG. 9 is the angular distribution of the light leaving the light pipe 40 in FIG. 5. In FIG. 9, the transverse axis is the angle of the light on a plane 51B, and the longitudinal axis is the light intensity. As shown in FIG. 9, the angular distribution is concentrated at $\beta$. Though $\beta$ is larger than 14 degrees, it is far less than 30 degrees. Thus, the limitation of the incident angle for the display panel 58 is satisfied.

Figure 10:
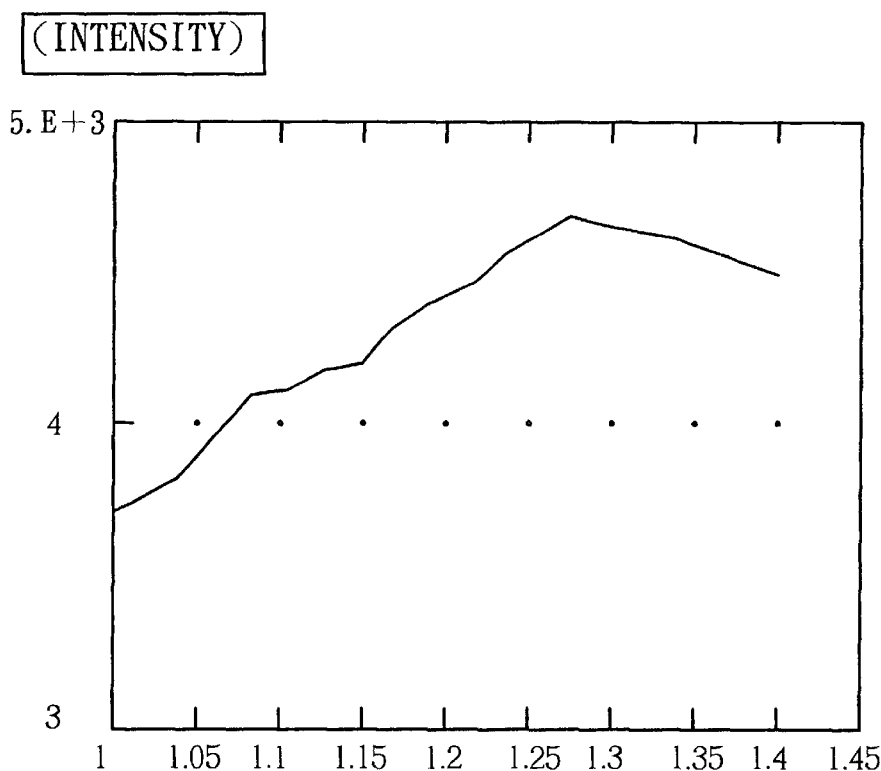
FIG. 10 is the relation between the opening ratio and the intensity of the light leaving the light pipe in FIG. 5.

Please refer to FIG. 10. FIG. 10 is the relation between the intensity of the light leaving the light pipe 40 in FIG. 5 and the opening ratio P. FIG. 10 shows the simulated result of the light pipe 40 of the present invention using optic simulation software. The transverse axis of FIG. 10 is the opening ratio P, which is the ratio of the size of the entrance pupil 50 to the size of the exit pupil 52, and the longitudinal axis is the intensity of the effective light leaving the light pipe 40. As the opening ratio P increases, the light pipe 40 gathers more light and the light leaving the light pipe 40 is more intense. However, the opening ratio P cannot be increased without limitation, or the angle of the light leaving the light pipe 40 becomes too large to be modulated by the display panel 58. As shown in FIG. 10, the effective light leaving the light pipe 40 becomes most intense when the opening ratio P is about 1.25~1.35, and therefore the light pipe 40 has the highest light gathering efficiency.

Figure 1:
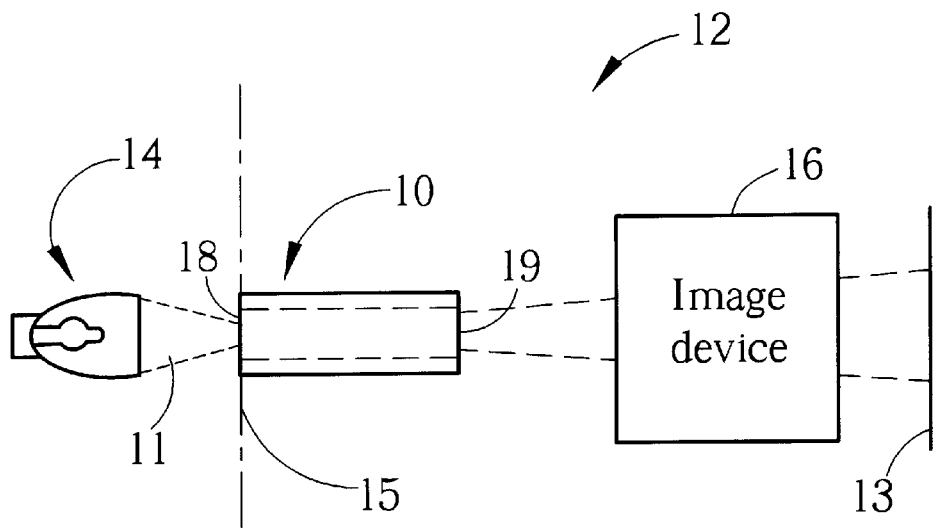
FIG. 1 is a schematic diagram of a prior art light pipe used in a projector system.
Figure 11:
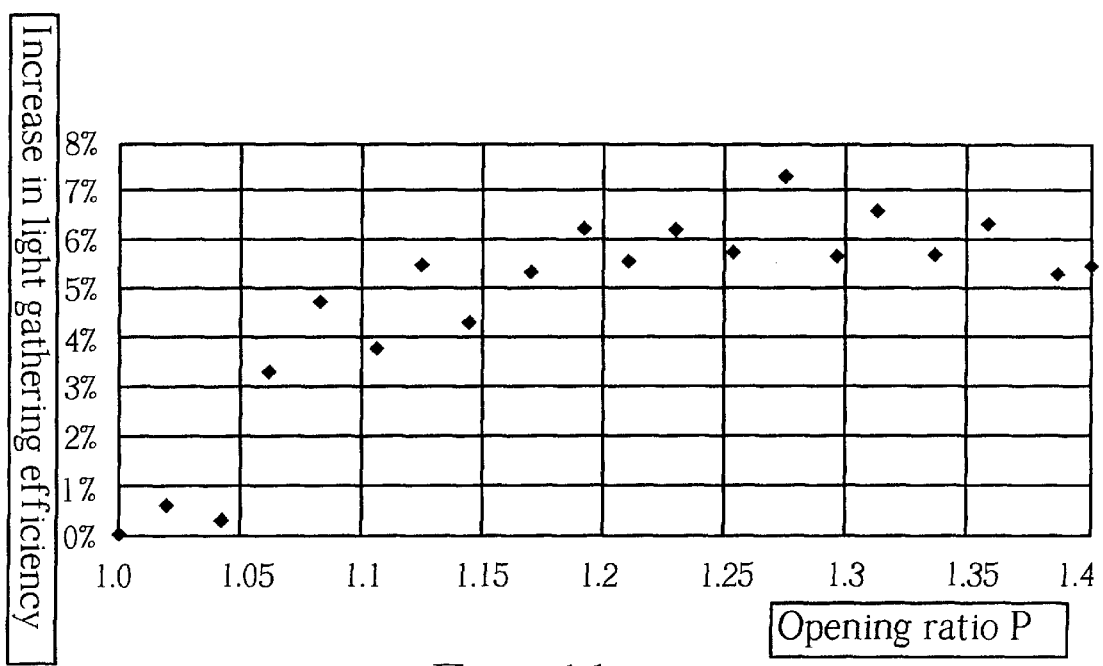
FIG. 11 is the schematic diagram of the light gathering efficiency improvement of the light pipe in FIG. 5 in comparison with the light pipe in FIG. 1.

Please refer to FIG. 11. FIG. 11 is a graph of the improvement in the light gathering efficiency of the light pipe 40 in FIG. 5 in comparison with the light pipe 10 in FIG. 1. The transverse axis of FIG. 11 is the opening ratio P, and the longitudinal axis is the percentage improvement of the intensity of the light leaving the light pipe 40 in comparison with that leaving the light pipe 10, that is, the percentage improvement of the light gathering efficiency. As shown in FIG. 11, when the opening ratio reaches 1.1, there is an obvious 4% improvement. When the opening ratio P becomes 1.25~1.35, the light intensity of the light pipe 40 of the present invention increases 6–7% in comparison with that of the prior art light pipe 10. It is obvious, then, that the light pipe 40 of the present invention has a higher light gathering efficiency than the prior art light pipe 10.

In the above-cited embodiment, the length of the light pipe 40 is 25 mm (0.98425 inches) and the arc length of the arc lamp 54 is 1.8 mm (0.0709 inches). In fact, the structure of the present invention can be used to optimize the light gathering efficiency by calculating the optimal opening ratio P for given light source characteristics, light collector, length of the light pipe and the arc length, etc.

In comparison with the prior art light pipes 10, 20, the light pipe 40 of the present invention is formed from four trapezoidal flat plates 62. The area of the exit pupil 52 is smaller than that of the entrance pupil 50, and the shape of the exit pupil 52 is scaled from that of the entrance pupil 50. Therefore, the light gathering efficiency of the light pipe 40 of the present invention is increased within a limited space. Optic simulation software shows that the intensity of the light leaving the light pipe 40 of the present invention is higher than that of the prior art light pipe 10.

Those skilled in the art will readily observe that numerous modifications and alterations of the device may be made while retaining the teachings of the invention. Accordingly, the above disclosure should be constructed as limited only by the metes and bounds of the appended claims.

What is claimed is:

1. A light pipe for a projection system, the projection system comprising a light source to generate light and to guide the light to the light pipe, and an image device to generate an image using the light gathered by the light pipe, the light pipe being a hollow tapering pipe set between the light source and the image device, the light pipe comprising:

four trapezoidal flat plates, each of the trapezoidal flat plates having a top end, a bottom end and two sides, the sides of the trapezoidal flat plates being joined together to form the light pipe;

an entrance pupil located at one end of the light pipe, the entrance pupil formed by the four bottom ends of the four trapezoidal flat plates, the light generated by the light source being guided to the light pipe through the entrance pupil; and an exit pupil located at another end of the light pipe, the exit pupil formed by the four top ends of the four trapezoidal flat plates, the light gathered by the light pipe being guided to the image device through the exit pupil;

wherein the area of the exit pupil is smaller than that of the entrance pupil, and the shape of the exit pupil is scaled from that of the entrance pupil so as to increase the light gathering efficiency of the light pipe.

2. The light pipe of claim 1 wherein the ratio of length to width for both the entrance pupil and the exit pupil is 4/3.

3. The light pipe of claim 1 wherein the ratio of length to width of both the entrance pupil and the exit pupil is 16/9.

4. The light pipe of claim 1 further comprising four reflector walls respectively set on the inner sides of the four trapezoidal flat plates to reflect the visible portion of the light.

5. The light pipe of claim 1 wherein the light source of the projection system comprises:

an arc lamp for generating the light; and a collector for gathering the light generated by the arc lamp and guiding the light to the entrance pupil.

6. The light pipe of claim 5 wherein the arc length of the arc lamp is about 1.8 mm (0.0709 inch).

7. The light pipe of claim 6 wherein the length of the light pipe is about 25 mm (0.98425 inch).

8. The light pipe of claim 7 wherein the ratio of the size of the entrance pupil to the size of the exit pupil is 1.1~1.35 so as to optimize the light gathering efficiency of the light pipe.

9. The light pipe of claim 1 wherein the image device of the projection system comprises:

a display panel set on an light imaging path;

plurality of optic lenses set between the light pipe and the display panel to guide the light gathered by the light pipe to the display panel to form the image; and a projection lens set between the display panel and a screen to project the image onto the screen.

10. The light pipe of claim 1 wherein the projection system is a projector or a liquid crystal display (LCD).

* * * * *